US006778185B1

(12) United States Patent
Moroney

(10) Patent No.: US 6,778,185 B1
(45) Date of Patent: Aug. 17, 2004

(54) METHOD AND APPARATUS FOR MAPPING COLORS INTO A COLOR GAMUT

(75) Inventor: Nathan McPherson Moroney, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 206 days.

(21) Appl. No.: 10/071,975

(22) Filed: Feb. 6, 2002

(51) Int. Cl.$^7$ ................................................ G09G 5/02
(52) U.S. Cl. ...................... 345/590; 345/591; 345/601; 345/604
(58) Field of Search ............................... 345/590, 601, 345/604, 591

(56) References Cited

U.S. PATENT DOCUMENTS

| | | | | |
|---|---|---|---|---|
| 6,388,674 B1 | * | 5/2002 | Ito et al. ..................... | 345/590 |
| 6,421,142 B1 | * | 7/2002 | Lin et al. ..................... | 358/1.9 |
| 6,459,436 B1 | * | 10/2002 | Kumada et al. ............ | 345/590 |
| 2003/0117457 A1 | * | 6/2003 | Qiao ........................... | 347/43 |

OTHER PUBLICATIONS

Stollnitz et al. "Reproducing Color Images Using Custom Inks", SIGGRAPH, ACM Press, 1998. Pp. 267–274.*
Weisstein, Eric W., "Cylindrical Coordinates", From Math-World–A Wolfram Web Resource, http://mathworld.wolfram.com/CylindricalCoordinates.html.
Weisstein, Eric W., "Spherical Coordinates", From Math-World–A Wolfram Web Resource, http://mathworld.wolfram.com/SphericalCoordinates.html.
Cottingham, Judith G., "Comparison of Color Tolerance Formulae", http://www.ams.org/careers/jcotting-cs.html.
"The Polar and Cylindrical Coordinate Systems and their Unit Vectors", http://physics.smsu.edu/faculty/broerman/fall03/phy203/polar1.htm.
Vasko, Sasha et al. "Desktop Colorscheme Specification", 2003, http://freedesktop.org/Standards/colorscheme-spec/colorscheme-spec-0.1.html.

* cited by examiner

Primary Examiner—Matthew C. Bella
Assistant Examiner—Antonio Caschera

(57) ABSTRACT

Some embodiments of the invention provide a method for mapping a source color into a color gamut without changing the value of its hue attribute. In some embodiments, a source color is initially represented by a first set of color coordinates that are defined with respect to a first coordinate system. The first set of color coordinates is then transformed to a second set of color coordinates, defined in a second coordinate system. If the second set of color coordinates is outside of a selected color gamut, the value of a first color coordinate of the second set of color coordinates is reduced until the second set of color coordinates is in-gamut. The first coordinate axis of the second coordinate system is either an "R" axis or a coordinate axis that is independent of hue, "H", and not identical to chroma, C*. The in-gamut set of color coordinates comprises a gamut-mapped color corresponding to the source color.

32 Claims, 8 Drawing Sheets

METHOD AND APPARATUS FOR MAPPING COLORS INTO A COLOR GAMUT

BACKGROUND OF THE INVENTION

A color space is a three dimensional representation of the three independent color attributes, hue ("H"), lightness ("L"), and chroma ("C") that define the range of colors.

The hue attribute of a color describes the differences in appearance related to different apparent frequencies of the observed light (e.g., from reds at a wavelength of ~7000 angstroms, to blues and violets at ~4000 angstroms.) Examples spanning the usual range of the hue dimension of color space include the cross-section of a rainbow and a circle of constant radius on the well known "color wheel".

The lightness attribute of a color ranges from black, through dark gray, gray and light gray, to white. Lightness changes a hue such as red to produce a color such as light red or dark red.

The chroma attribute of a color describes the relative amounts of different hues that are included in the color, and determines the color's vividness. A wavelength of light of a single hue (e.g., light from a laser) has high chroma and a vivid color. Nearly equal mixing of all hues produces low chroma and a brownish appearance.

Color spaces may represent the attributes hue, lightness and chroma using a variety of coordinate systems. Each color is defined by a set of color coordinates representing a value along each axis of the selected coordinate system. One commonly used coordinate system is the CIELAB (Commission Internationale de L'Eclairage L* a* b* color space coordinate system. The CIELAB axes L*, a*, and b* comprise a rectangular coordinate system. The L* or lightness axis goes from back to front, with positive values corresponding to increasing whiteness. The a* or green-red axis goes from left to right, with positive values corresponding to increasing redness. The b* or blue-yellow axis goes from bottom to top, with positive values corresponding to increasing yellowness.

Color imaging devices (e.g., printers, monitors and cameras) detect or reproduce only a particular limited range of the colors in the device independent color space. This limited range of the color space is a device dependent color gamut. A frequent problem encountered in color reproduction is that the color gamut of a destination device differs from that of a source device or image. During transfer of color information from the source device to the destination device, some of the colors included in the image of first device may be physically unrealizable (out-of-gamut) on the destination device. A specified color is out-of-gamut when there are no colors in the color gamut having a set of color coordinates equal to those of the specified color.

The need for color gamut-mapping arises when the source image contains out-of-gamut colors for a specified destination device. It is important to have an effective gamut-mapping process in order to transfer visually appealing color images between devices with disparate color gamuts.

Mapping an out-of-gamut color into a color gamut thus requires changing at least one color coordinate of the out-of-gamut color so that each color coordinate of the mapped color is equal to that of a color in the color gamut.

One method to map an out-of-gamut color into a color gamut is to select the color coordinate along one coordinate axis of the color space coordinate system, and reduce it until the mapped color is in-gamut. For the CIELAB color space, one might select to reduce the a* axis color coordinate, the b* axis color coordinate, or the L* axis color coordinate. For example, a vivid orange color with middle ligthness (L*=50) might be brought in-gamut by reducing the a* axis color coordinate. However, as redness (a*) is reduced with yellowness (b*) constant, the hue becomes increasingly yellow. Similarly, reducing the b* axis color coordinate with constant a*, the hue becomes increasingly red. Unfortunately, the eye is extremely sensitive to changes in hue, making these changes objectionable to an observer. In the selected example (L*=50) and so cannot be reduced to bring the color in-gamut.

A second method to map an out-of-gamut color into a color gamut is to employ a look-up table of color coordinates to be mapped and corresponding in-gamut mapped color coordinates. For the CIELAB color space, this method is unwieldy, requiring determination and processing of a large table that encompasses the full range of three-coordinate combinations.

A third method to map an out-of-gamut color onto a gamut is described by G. Braun and M. Fairchild in the Proceedings of the $5^{th}$ Color Imaging Conference, pp. 147–152 (1998). According to this method, a set of "LAB" color coordinates of an out-of-gamut color represented in the CIELAB color space is transformed to a corresponding set of color coordinates in a cylindrical "LCH" coordinate system. The "LCH" coordinate system includes a lightness axis (L*), a chroma axis $\{C^*=(a^{*2}+b^{*2})^{1/2}\}$, and a hue axis ("H"=arctan(b*/a*)) as previously described. An out-of-gamut color, represented as a set of "LCH" color coordinates is brought into a color gamut by reducing the C* axis color coordinate until an in-gamut color is obtained. The set of "LCH" color coordinates of the in-gamut color may then be reverse transformed to generate a set of in-gamut color coordinates in the "LAB" coordinate system. This method has an important advantage over the method of changing the a* or b* axis coordinate of the CIELAB coordinate system. The human eye is much less sensitive to small changes in chroma than similarly small changes in hue. Therefore, the mapped in-gamut colors generally appear more similar to the out-of-gamut colors when only chroma, the C* axis of the LCH polar coordinate system, is changed.

Gamut-mapping by changing only chroma is effective for mapping colors into a gamut with a fairly uniform maximum chroma value for the full range of "H" and L* values (i.e., a nearly cylindrical gamut). For other color gamut shapes, a large change of the C* coordinate may be necessary to bring a color in-gamut. In such cases the mapped in-gamut color can appear noticeably brownish and washed out, compared to the out-of-gamut color. In these cases there may be, for example, a more similar in-gamut color having a similar C* value and a slightly different value of luminosity.

Therefore there is a need in the art for and improved method for mapping colors into a color gamut. The out-of-gamut colors should appear similar to the corresponding mapped in-gamut colors, for a wide range of color gamuts.

SUMMARY OF THE INVENTION

Some embodiments of the invention provide a method for mapping a source color into a color gamut without changing the value of its hue attribute. In some embodiments, a source color is initially represented by a first set of color coordinates that are defined with respect to a first coordinate system. The first set of color coordinates is then transformed to a second set of color coordinates, defined in a second coordinate system. If the second set of color coordinates is outside of a selected color gamut, the value of a first color coordinate of the second set of color coordinates is reduced until the second set of color coordinates is in-gamut. The first coordinate axis of the second coordinate system is either an "R" axis or a coordinate axis that is independent of hue, "H", and not identical to chroma, C*. The in-gamut set of color coordinates comprises a gamut-mapped color corresponding to the source color.

The gamut-mapping procedure may be applied to a source image or device color gamut comprising many colors defined in a first coordinate system. These colors are gamut-mapped into a color gamut of a destination device (such as a printer) defined in a second coordinate system. According to some embodiments of the invention, the color coordinates of the gamut-mapped colors may be reverse transformed from the second coordinate system to the first coordinate system. According to other embodiments of the invention, the color coordinates of the gamut-mapped colors may be transformed from the second coordinate system to a third coordinate system used by the destination device.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

A method and apparatus for gamut-mapping colors into a color gamut is disclosed. In the following description, for purposes of explanation, specific nomenclature is set forth to provide a thorough understanding of the invention. However, it will be apparent to one skilled in the art that these specific details are not required in order to practice the invention. For instance, the color space coordinate transformations discussed below employ the commonly used CIELAB coordinate system as a first coordinate system. However, similar coordinate transformations may be performed to similar advantage, starting with other coordinate systems, such as CIELUV or CIECAM97s. In other instances, well-known structures and devices are shown in block diagram form in order not to obscure the description of the invention with unnecessary detail.

Procedure to Map Colors into a Color Gamut

Transfer of color information from a source image or device, to a destination device, requires that the colors included in the source to be mapped to colors in the color gamut of the destination device. In various embodiments of the invention, color information from the source is represented as sets of color coordinates in a first coordinate system. The color coordinates are transformed to color coordinates in a convenient second coordinate system. Then, the color coordinates in the convenient second coordinate system are mapped to in-gamut color coordinates in the color gamut of the destination device. Finally, the in-gamut color coordinates are transformed to in-gamut color coordinates in the coordinate system of the destination device.

Figure 1:
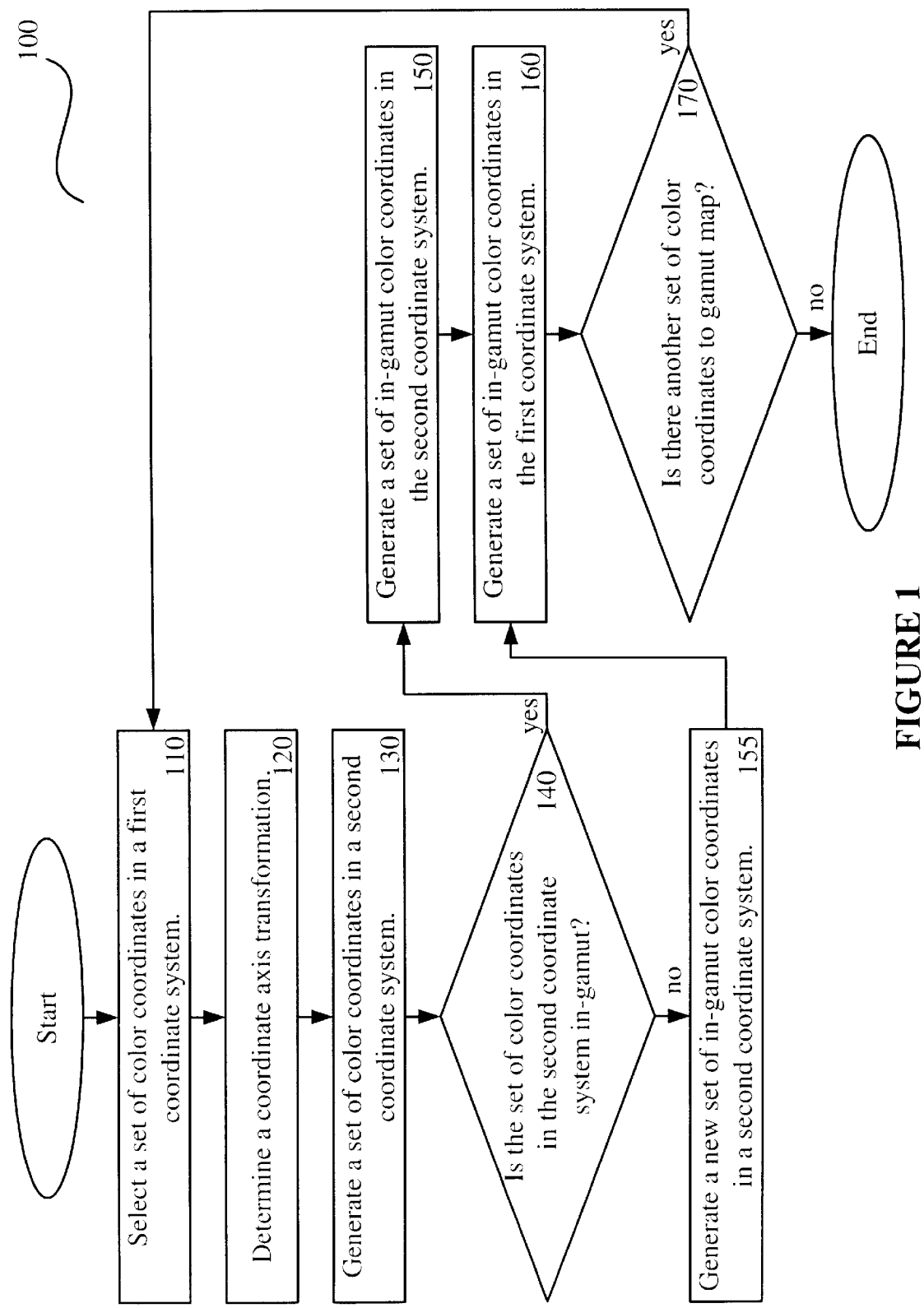
FIG. 1 is a flowchart of a procedure to map a color into a color gamut according to at least one embodiment of the invention.

FIG. 1 illustrates a flowchart of a procedure to map color coordinates into a color gamut according to at least one embodiment of the invention. As shown in FIG. 1, the gamut-mapping procedure 100 begins at block 110, where a set of color coordinates representing a source color are selected. The source color may be a color pixel in an image, a color in a color gamut of a source device, or any color in a selected color space. The set of color coordinates of the source color are represented in a first coordinate system (e.g., an "RGB" coordinate system, an "CIELAB" coordinate system, a "CMY" coordinate system, another rectangular coordinate system, an "LCH" cylindrical coordinate system, or another coordinate system).

At block 120, a convenient second coordinate system for gamut-mapping the source color is selected. A coordinate transformation from the first coordinate system to the second coordinate system is also determined. The second coordinate system includes a first axis that is independent of a hue axis, a second axis, and a third axis. The embodiments of the coordinate transformation and the second coordinate system will be further described in reference to FIGS. 2–5.

At block 130, the coordinate axis transformation is applied to a source color. The source color's set of color coordinates in the first coordinate system is used to generate a set of color coordinates in the second coordinate system.

At block 140, the set of color coordinates in the second coordinate system is determined to be either inside or outside of a selected destination device color gamut. The color gamut is specified by sets of color coordinates in the second coordinate system. In some embodiments, the sets of color coordinates of the color gamut are also transformed to the second coordinate system by a procedure similar to that described for a single source color at blocks 110–130.

The set of source color coordinates is in-gamut when it has: (1) a second axis color coordinate and a third axis color coordinate equal to a second axis color coordinate and a third axis color coordinate of a particular set of coordinates on the color gamut boundary, and (2) a first axis color coordinate with absolute value less than or equal to the first axis color coordinate of the particular set of coordinates on the color gamut boundary.

If at block 140, the source color coordinates are determined to be out-of-gamut, the procedure continues at 150. If at block 140, the source color coordinates are determined to be in-gamut, the procedure continues at 155.

At block 150, the set of out-of-gamut color coordinates in the second coordinate system is used to generate a set of in-gamut color coordinates in the second coordinate system. The set of in-gamut color coordinates is generated by reducing the first axis color coordinate until the set of color coordinates is equal to that of an in-gamut color. This procedure is further described in reference to FIG. 2.

At block 155, a set of in-gamut source color coordinates is mapped to a "new" set of in-gamut color coordinates. In some embodiments, the "new" set of mapped in-gamut color coordinates is identical to the set of in-gamut source color coordinates. In other embodiments, the first axis color coordinate of the in-gamut source color is either reduced or increased. A different set of "new" in-gamut mapped color coordinates are generated by a procedure similar to that described for block 150. "New" in-gamut color coordinates may be desirable, for example, to distinguish an in-gamut source color on the color gamut boundary from an out-of-gamut color mapped to the color gamut boundary.

At block 160, the set of mapped in-gamut color coordinates in the second coordinate system is used to generate a set of mapped in-gamut color coordinates in the first coordinate system or a third coordinate system desired for further processing of the color. In some embodiments, reversing the coordinate axis transformation described at block 120 generates a set of in-gamut color coordinates in the first coordinate system. In other embodiments, a different coordinate axis transformation generates a set of in-gamut color coordinates in the third coordinate system. In still other embodiments, no further coordinate axis transformation is performed.

At block 170, if there is another set of source color coordinates to gamut map, the procedure reverts back to block 110, and steps 110-170 are repeated. If there are no more sets of source color coordinates to gamut map, the procedure ends.

Transforming to a Second, Spherical Coordinate System

Figure 2A:
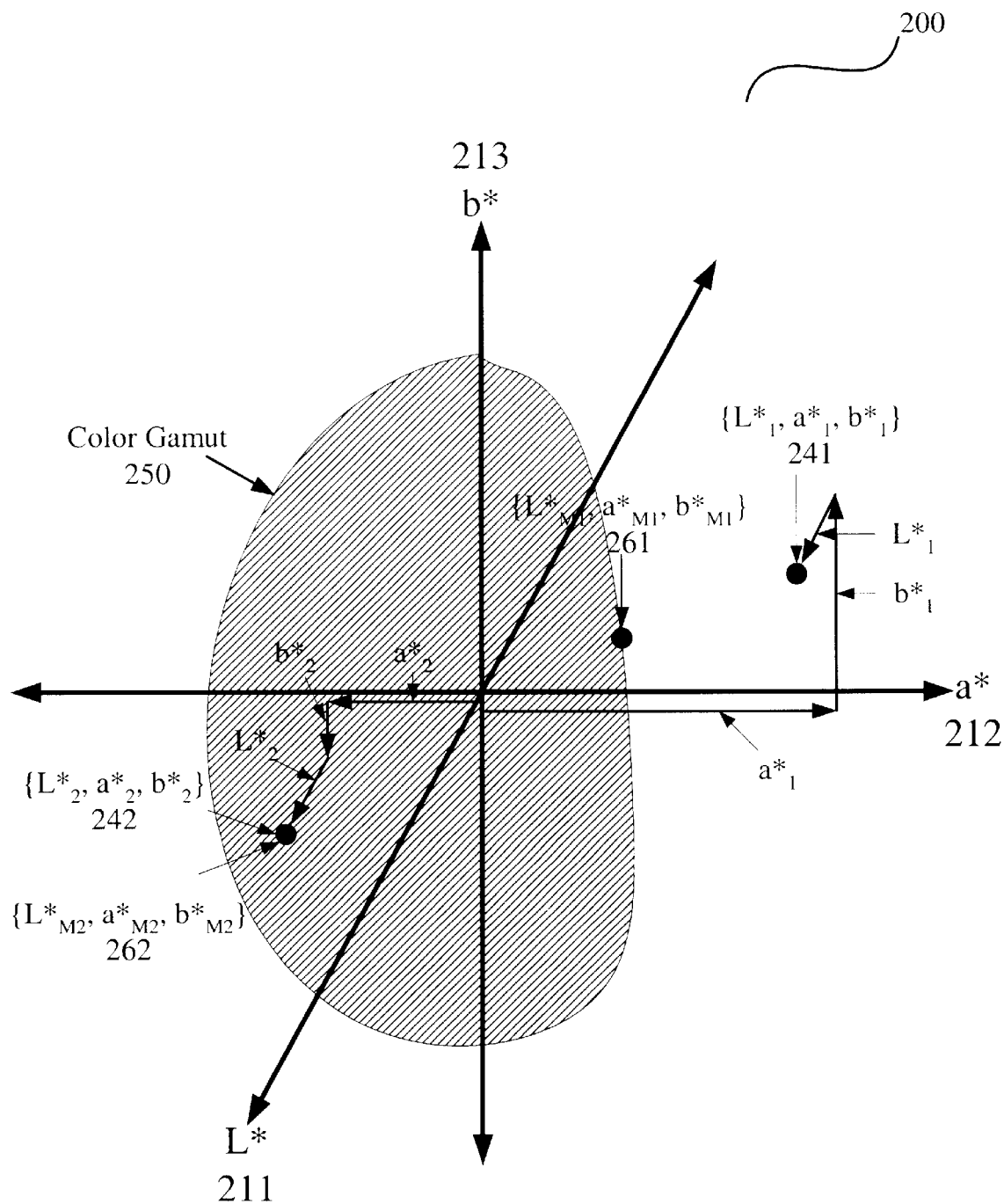
FIG. 2a is a schematic of colors and a color gamut in a color space represented in a CIELAB rectangular coordinate system according to at least one embodiment of the invention.

In various embodiments of the invention, the coordinate axes of a color space are transformed from a first coordinate system to a second coordinate system, according to the procedures of FIG. 1. FIG. 2 illustrates one embodiment of the invention's coordinate axis transformation, from a rectangular coordinate system to a spherical coordinate system. In FIG. 2a, source color and a color gamut are represented in a CIELAB rectangular coordinate system 200. As shown in FIG. 2a, the color space includes (1) an L* axis 211, (2) an a* axis 212, (3) a b* axis 213, (4) source colors 241 and 242, (5) a color gamut 250, and (6) gamut-mapped colors 261 and 262.

The L* axis 211, the a* axis 212, and the b* axis 213 are three independent coordinate axes that comprise a rectangular CIELAB coordinate system. Coordinates along the L* axis 211 represent values of the L* color attribute, lightness. Coordinates along the a* axis 212 represent values of the a* color attribute, "red-green". Coordinates along the b* axis 213 represent values of the b* color attribute, "yellow-blue".

The color gamut 250 includes a plurality of sets of color coordinates represented in the first coordinate system. With respect to color gamut 250, source colors include an out-of-gamut color $\{L^*_1, a^*_1, b^*_1\}$ 241 and an in-gamut color $\{L^*_2, a^*_2, b^*_2\}$ 242. Gamut-mapped colors $\{L^*_{M1}, a^*_{M1}, b^*_{M1}\}$ 261 and $\{L^*_{M2}, a^*_{M2}, b^*_{M2}\}$ 262, corresponding to colors 241 and 242, are also illustrated.

Figure 2B:
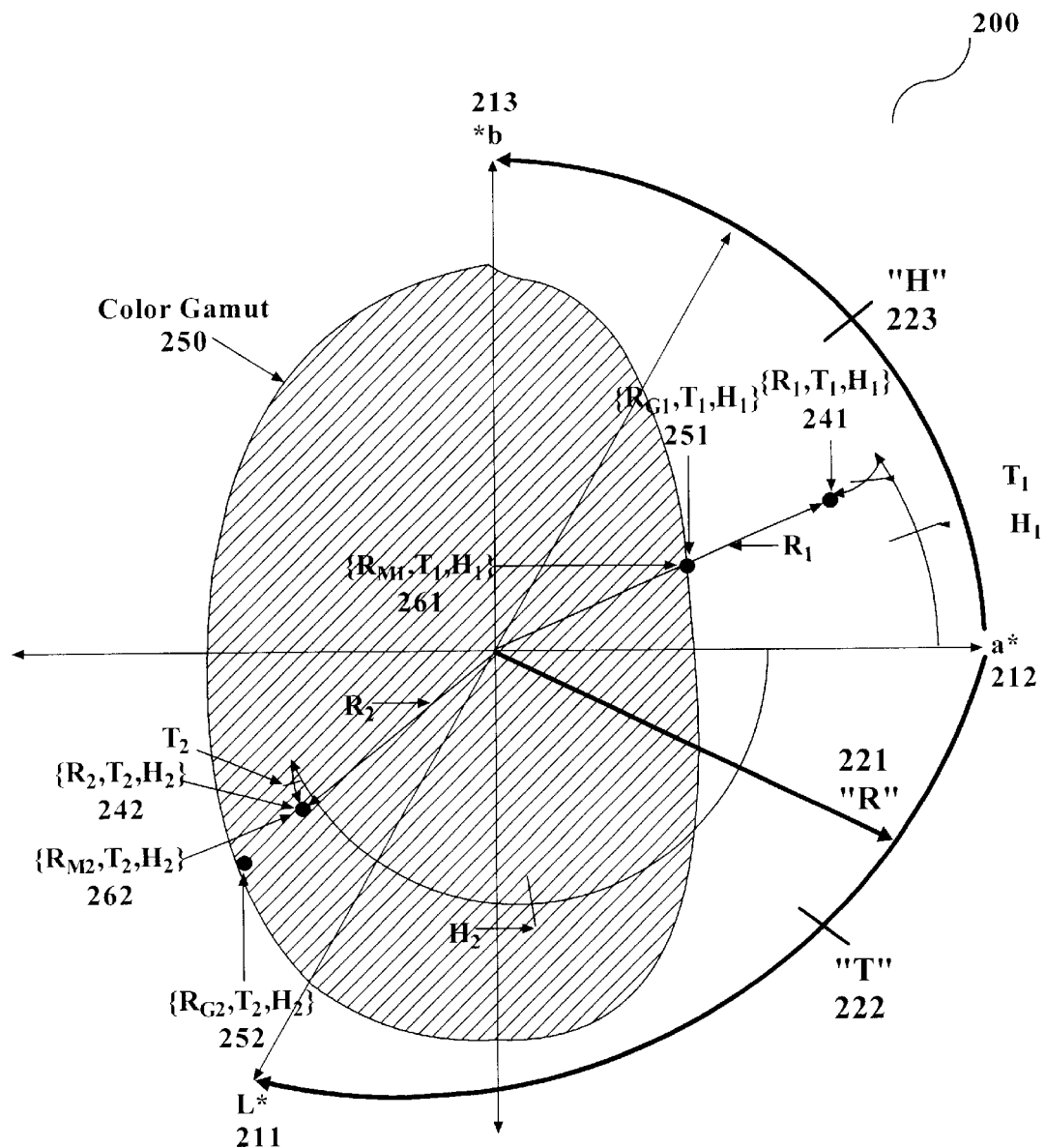
FIG. 2b is a schematic of colors and a color gamut in a color space represented in a spherical coordinate system according to at least one embodiment of the invention.

FIG. 2b illustrates the same source colors and color gamut in a color space 200 represented in a CIELAB rectangular coordinate system and a spherical "RTH" coordinate system. As shown in FIG. 2b, the color space includes (1) an L* axis 211, (2) an a* axis 212, (3) a b* axis 213, (4) an "R" axis 221, (5) a "T" axis 222, (6) an "H" axis 223, (7) source colors 241 and 242, (8) a color gamut 250, (9) colors on the boundary of the color gamut 251 and 252, and (10) gamut-mapped colors 261 and 262.

The locations of the L* axis 211, the a* axis 212, and the b* axis 213 are unchanged from FIG. 2a. The "R" axis 221, the "T" axis 222, and the "H" axis 223 are three independent coordinate axes that comprise a spherical coordinate system. Coordinates along the "R" axis 221 represent values of the "R" color attribute, which is a radial distance metric in color space given by "R"=$((L^*-c_1)^2+(a^*-c_2)^2+(b^*-c_3)^2)$ where $c_1$, $c_2$, and $c_3$ are a fixed angle, such as 50, 0, 0. Although a specific "R" axis direction is shown, the direction of the "R" axis may take on any value, as demonstrated by color coordinates $R_1$ and $R_2$. Coordinates along the "T" axis 222 represent values of the "T" color attribute, given by "T"= arccos("L*"/"R"). "T" represents an angular measure in the L*-a* plane. Coordinates along the "H" axis 223 represent values of the "H" color attribute, hue. "H" represents an angular measure in the a*-b* plane.

The locations of the source colors, $\{R_1, T_1, H_1\}$ 241 and $\{R_2, T_2, H_2\}$ 242, and color gamut 250 are unchanged from FIG. 2a. In the spherical coordinate system, color gamut 250 includes a boundary comprising one set of boundary color coordinates for each combination of "T" axis and "H" axis color coordinates. The "R" axis coordinate of each set of boundary color coordinates (e.g., $\{R_{G1}, T_1, H_1\}$ 251 and $\{R_{G2}, T_2, H_2\}$ 252) is the largest value of an in-gamut color having the selected "T" axis and "H" axis color coordinates.

Gamut-mapped color coordinates $\{R_{M1}, T_1, H_1\}$ 261 and $\{R_{M2}, T_2, H_2\}$ 262 are formed from source colors 241 and 242 by translating only along the "R" axis (the "clipping path"). All sets of color coordinates along a "clipping path" have the same "H" and "T" color coordinates, and thus have the same hue.

The source color 241 represented by the side of coordinates $\{L^*_1, a^*_1, b^*_1\}$ in the first coordinate system (FIG. 2a) is gamut-mapped into the color gamut 250 as follows. First, the side of "CIELAB" color coordinates 241 is transformed to a set of color coordinates $\{R_1, T_1, H_1\}$ 241 and the second coordinate system (FIG. 2b). Second, a set of coordinates on the color gamut boundary is located, which has the same "T" axis and "H" axis color coordinates as source color 241, i.e., $\{R_{G1}, T_1, H_1\}$ 251. The value $R_1$ is larger than $R_{G1}$, so color 241 is determined to be in out-of-gamut color. Third, a set of mapped in-gamut color coordinates is generated by reducing the "R" coordinate value along "R" to less than or equal to $R_{G1}$. In some embodiments, the in-gamut mapped set of color coordinates $\{R_{M1}, T_1, H_1\}$ 261 is equal to $\{R_{G1}, T_1, H_1\}$ 251 as shown. Each mapped in-gamut color has the same hue as its source color. Finally, the mapped set of color coordinates in the second coordinate system is reverse transformed to a mapped set out in-gamut color coordinates $\{L^*_{M1}, a^*_{M1}, b^*_{M1}\}$ 261 in the first coordinate system (FIG. 2a).

The source color 242 represented by the set of coordinates $\{L^*_2, a^*_2, b^*_2\}$ in the first coordinate system (FIG. 2a) is gamut-mapped into the color gamut 250. First, the source color 242 is transformed to a set of coordinates $\{R_2, T_2, H_2\}$ 242 in the second coordinate system (FIG. 2b). Second, a set of color coordinates on the color gamut boundary is located, which has the same "T" axis and "H" axis coordinates as color 242, i.e., $\{R_{G2}, T_2, H_2\}$ 252. The value $R_2$ is smaller than $R_{G2}$ so source color 242 is determined to be an in-gamut color. Third, and some embodiments, the set of mapped in-gamut color coordinates $\{R_{M2}, T_2, H_2\}$ 262 is identical to those of the source color 242, as shown. In other embodiments, the set of mapped in-gamut color coordinates is generated by changing the "R" coordinate value along the "R" axis "clipping path" to a "new" value less than or equal to $R_{G2}$, as described in reference to FIG. 2b. Finally, the mapped set of color coordinates in the second coordinate system is reverse transformed to a mapped set of in-gamut color coordinates $\{L^*_{M2}, a^*_{M2}, b^*_{M2}\}$ 262 in the first coordinate system (FIG. 2a).

Gamut-mapping Embodiments a) Gamut-to-gamut Mapping in a Spherical Coordinate System One embodiment of the invention's gamut-mapping employs the procedures described in reference to FIG. 1 and FIG. 2, to map the sets of color coordinates of a source device color gamut into a destination device color gamut. This embodiment of gamut-to-gamut mapping determines a set of mapped in-gamut color coordinates in the second (destination) color gamut for each source color in the first (source) color gamut.

Figure 3:
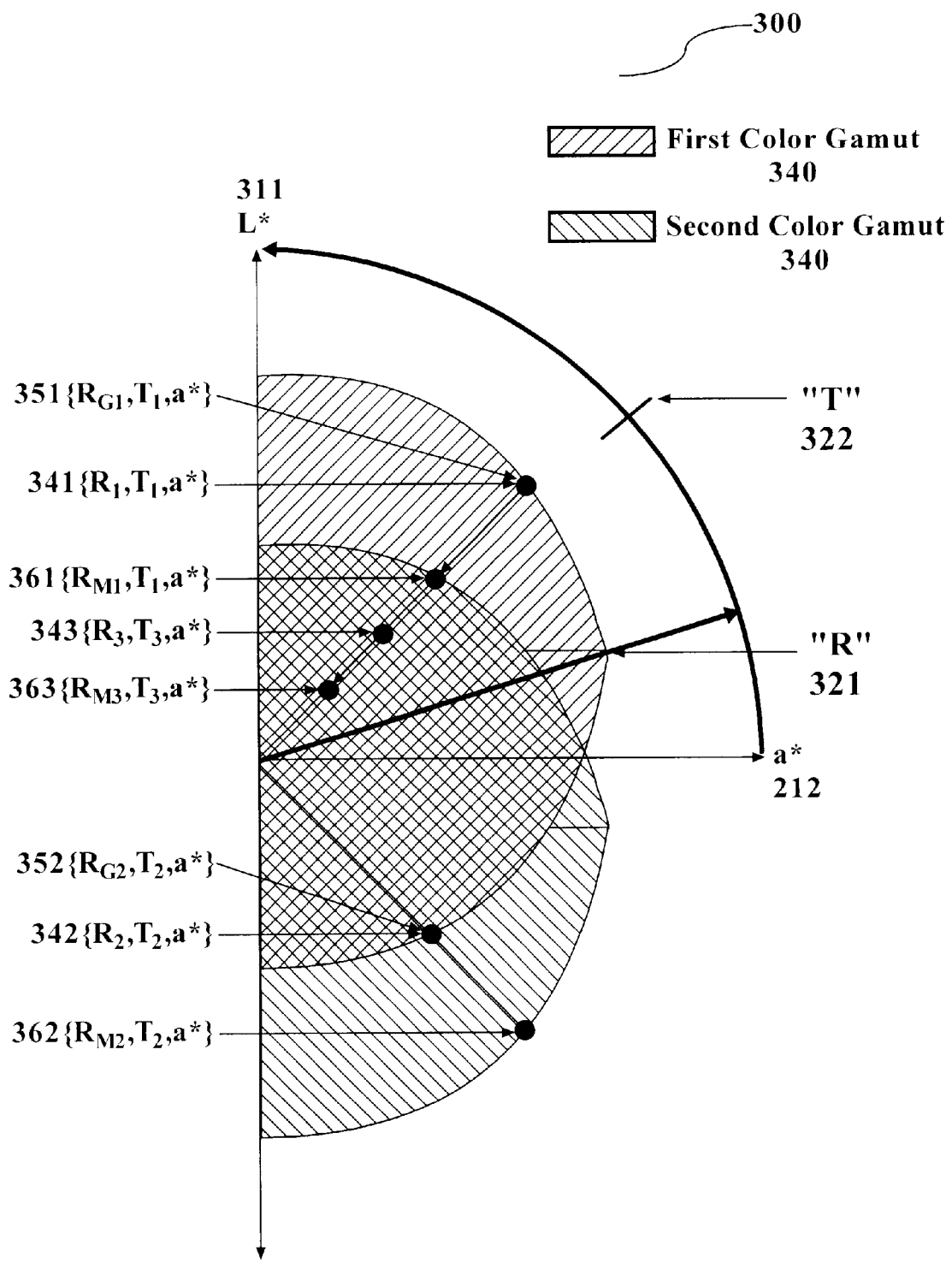
FIG. 3 illustrates one embodiment of mapping color coordinates of red hue colors from a first color gamut to a second color gamut.

FIG. 3 illustrates gamut-to-gamut mapping. For clarity, FIG. 3 and subsequent illustrations include only a two-dimensional slice of color space 300 defined by the positive a* half of the L*-a* plane. This slice of the color space includes a single red hue ("H"=a*) and the full range of chroma and luminosity. As shown in FIG. 3, the red hue color space includes (1) an L* axis 311, (2) an a* axis 312, (3) an "R" axis 321, (4) a "T" axis 322, (5) a first red color gamut 340, (6) source colors on the first red color gamut's boundary 341 and 342, (7) a source color inside the first red color gamut's boundary 343, (8) a second red color gamut 350, (9) colors on the second red color gamut's boundary 351 and 352, and (10) gamut-mapped colors 361, 362, and 363.

In some embodiments of gamut-to-gamut mapping, a set of color coordinates on the first red color gamut's boundary, such as $\{R_1, T_1, a^*\}$ 341, is outside of the second color gamut. Source color $\{R_1, T_1, a^*\}$ 341 is thus mapped into the second color gamut by reducing the "R" axis color coordinate as described in reference to FIG. 2. The "R" axis color coordinate, $R_1$, is reduced until an in-gamut color $\{R_{G1}, T_1, a^*\}$ 351 is reached. These color coordinates comprise the mapped in-gamut color coordinates $\{R_{M1}, T_1, a^*)\}$ 361 corresponding to the color $\{R_1, T_1, a^*)\}$ 341 of the first color gamut.

The set of color coordinates $\{R_2, T_2, a^*\}$ 342, on the first red color gamut's boundary, is in the second color gamut. The source color $\{R_2, T_2, a^*\}$ 342 is mapped by increasing the "R" axis color coordinate until an in-gamut color $\{R_{G1}, T_2, a^*\}$ 351 on the boundary of the second color gamut is reached. These color coordinates are determined to be the mapped in-gamut color coordinates $\{R_{M2}, T_2, a^*\}$ 362 corresponding to the source color $\{R_2, T_2, a^*\}$ 342. In other embodiments, the color coordinates of an in-gamut source color $\{R_2, T_2, a^*\}$ 342 are not changed.

Sets of source color coordinates inside the boundary of the first color gamut are mapped to color coordinates inside the second color gamut by changing the "R" axis color coordinate. For example, a set of color coordinates such as $\{R_3, T_3, a^*\}$ 343 is mapped to a set of color coordinates $\{R_{M3}, T_3, a^*\}$ 363 inside the second color gamut.

In one embodiment of gamut-to-gamut mapping, the mapped color coordinates $\{R_{Mi}, T_i, H_i\}$ of a source color $\{R_i, T_i, H_i\}$ are determined from a linear relationship including the coordinates of the first color gamut boundary color $\{R_{1i}, T_i, H_i\}$ and the second color gamut boundary color $\{R_{2i}, T_i, H_i\}$. $R_{Mi}=R_{2i}*(R_i/R_{1i})$. In a second embodiment, out-of-gamut color coordinates of the first color gamut are mapped to the boundary of the second color gamut, and in-gamut color coordinates of the first color gamut are not changed. In other embodiments, other mapping functions may be selected.

b) Gamut-mapping in a Spherical Coordinate System with a Variable Origin

Figure 4A:
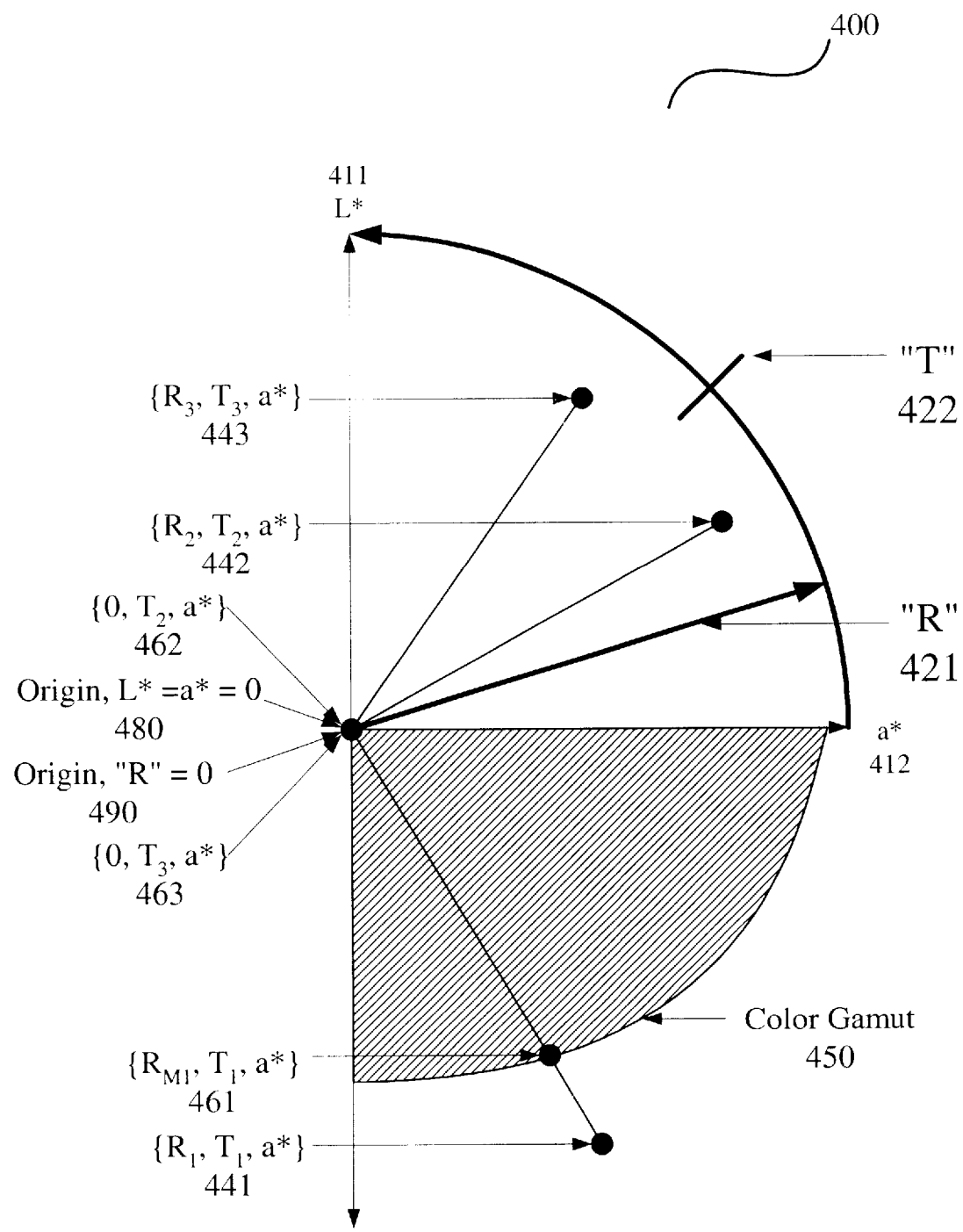
FIG. 4a illustrates one embodiment of mapping color coordinates of red hue colors into a color gamut.
Figure 4B:
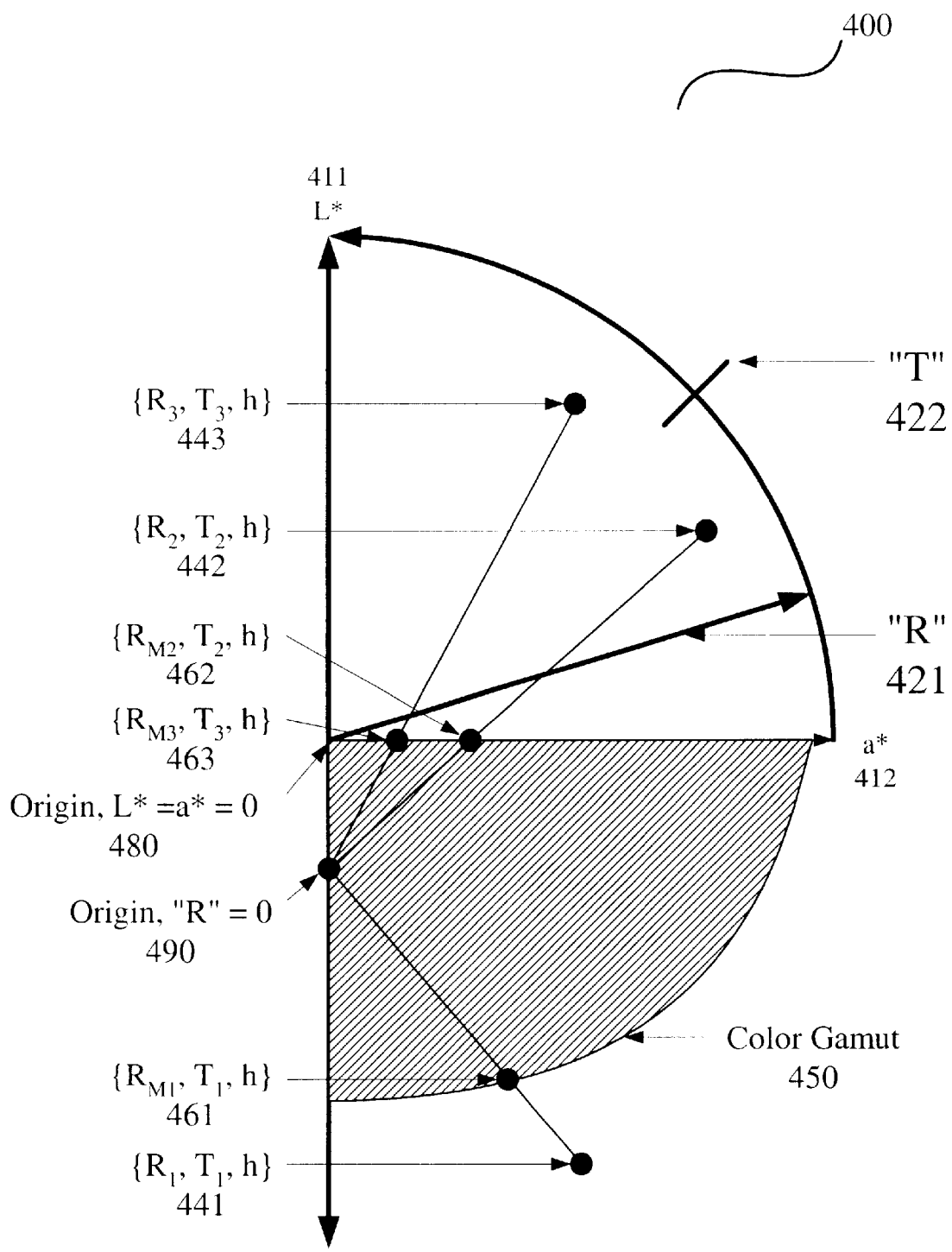
FIG. 4b illustrates a second embodiment of mapping color coordinates of red hue colors into a color gamut.

FIGS. 4a and 4b illustrate embodiments of the invention's gamut-mapping using a variable origin of the second coordinate system. These embodiments are illustrated by mapping sets of color coordinates into a color gamut having a maximum lightness, L*=0. Such a color gamut may arise, for example, when printing onto gray paper. As shown in FIG. 4a, the red hue color space 400 includes (1) an L* axis 411, (2) an a* axis 412, (3) an "R" axis 421, (4) a "T" axis 422, (5) a source color with L* color coordinate less than zero 441, (6) source colors with L* color coordinate greater than zero 442 and 443, (7) a red color gamut 450, (8) gamut-mapped colors 461, 462, and 463, (9) an origin of the first coordinate system 480, and (10) an origin of the second coordinate system 490.

A source color such as $\{R_1, T_1, a^*\}$ 441 is mapped to in-gamut colorcoordinates $\{R_{M1}, T_1, a^*\}$ as previously described. However, when source color $\{R_2, T_2, a\}$ 442 is mapped, the "R" axis color coordinate is reduced to zero before a set of in-gamut color coordinates $\{0, T_2, a^*\}$ 462 is reached. Similarly, the mapped in-gamut color coordinates for $\{R_3, T_3, a^*\}$ 443 are $\{0, T_3, a^*\}$ 463. Thus, for the selected second coordinate system, each light red source color having an L* axis coordinate greater than zero is mapped to the same color coordinates corresponding to neutral gray.

The red hue color space 400 shown in FIG. 4b includes the same components as FIG. 4a. However, in FIG. 4b, the origin of the "R" and "T" axes 490 is shifted below the origin of the origin of the L* and a* axes 480, to an L* axis coordinate less than zero. With the origin of the second, "RTH", coordinate system 490 shifted to L* less than zero, the out-of-gamut red source color $\{R_2, T_2, a^*\}$ 442 is mapped, to the in-gamut red color coordinates $\{R_{M2}, T_2, a^*\}$. The out-of-gamut red source color $\{R_3, T_3, a^*\}$ 443 is mapped, to different in-gamut red color coordinates $\{R_{M3}, T_3, a^*\}$.

In some embodiments of the invention's gamut-mapping with a variable origin, the origin of the second transformed coordinate system 490 is shifted so as to improve the gamut-mapping of selected colors. In one embodiment, a look-up table of the set of source color coordinates selects the origin of the second coordinate system 490. In a second embodiment, the origin of the second coordinate system is calculated as a function of the values of the set of source color coordinates. In a third embodiment, the origin of the second coordinate system 490 is constant, but displaced from the origin of the first coordinate system 480.

c) Gamut-mapping Coordinate Systems

The second coordinate system of the invention has several requirements. In each embodiment, the second coordinate system comprises a first axis wherein only the first axis color coordinates are changed during gamut-mapping. Also, the color coordinates along the second and third axes of the second coordinate system are not changed during gamut-mapping. Furthermore, the first axis is independent of the hue axis, and for at least one color in the color space, is not identically equal to chroma. However, the second coordinate system is not always a spherical coordinate system, and the first coordinate axis is not necessarily "R"=$((L^*-c_1)^2+(a^*-c_2)^2+(b^*-c_3)^2)$.

One such embodiment of the invention's gamut-mapping procedure comprises a "T" axis of a spherical coordinate system as the first coordinate axis. In this embodiment, only the hue independent "T" axis is changed when mapping a source color into a color gamut. A second such embodiment comprises transforming to a cylindrical "LCH" coordinate system or an "CIELAB" coordinate system, and clipping along the hue independent L* axis. A third such embodiment comprises transforming to another non-spherical coordinate system and clipping along another hue independent metric other than "R"=$((L*-c_1)^2+(a*-c_2)^2+(b*-c_3)^2)$.

d) Gamut-mapping in a Variable Coordinate System

Some embodiments of the invention's gamut-mapping use a variable second coordinate system. The second transformed coordinate system is selected so as to improve the gamut-mapping of selected colors. In one embodiment, the second coordinate system is selected by a look-up table of the set of color coordinates to be mapped. In a second embodiment, the origin of the second coordinate system is calculated as a function of the values of the set of color coordinates to be mapped.

Figure 5:
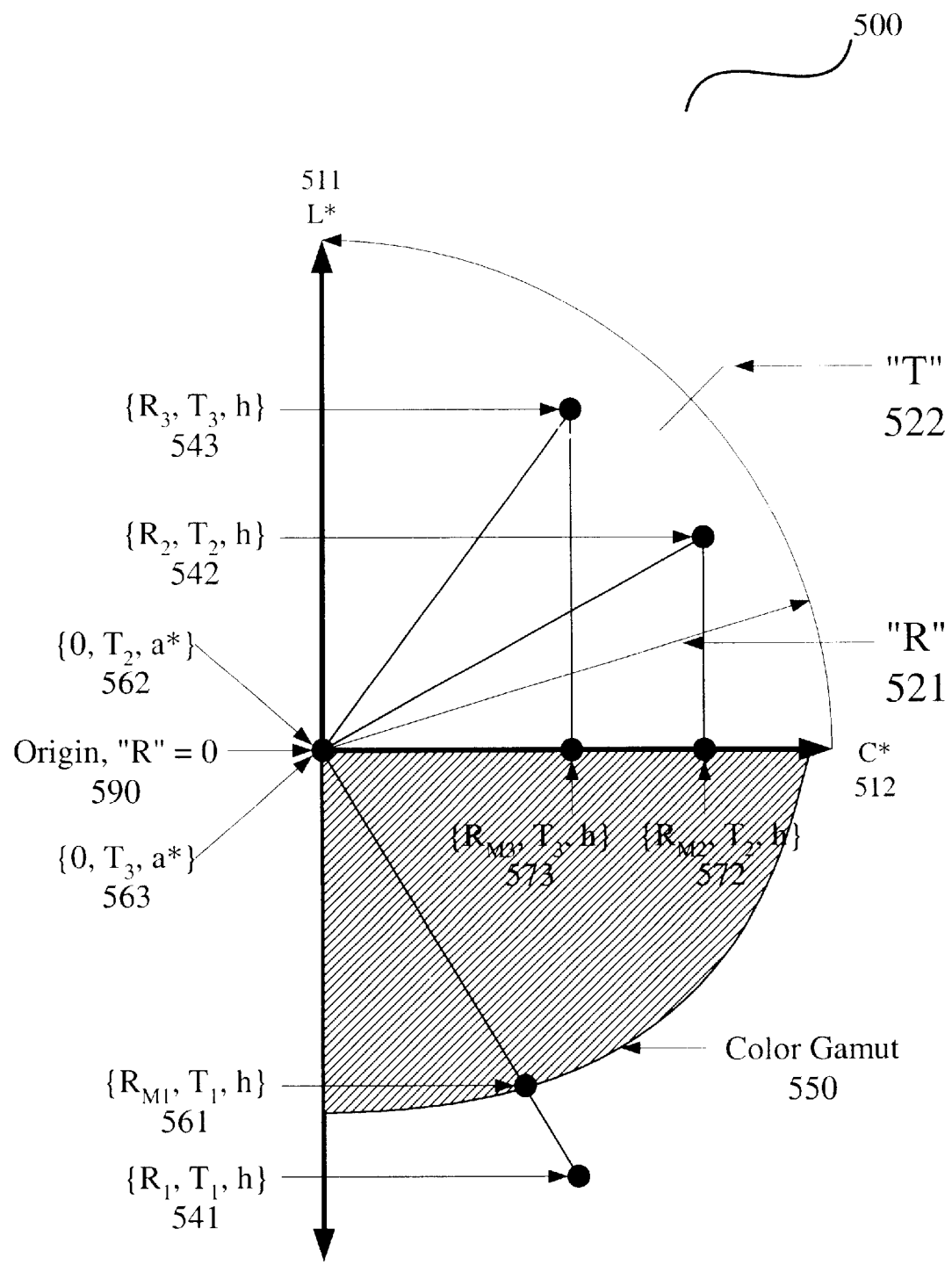
FIG. 5 illustrates one embodiment of mapping color coordinates of red hue colors into a color gamut using a different second coordinate system.

FIG. 5 illustrates an embodiment of the invention's gamut-mapping using a variable second coordinate system. This embodiment is illustrated by mapping sets of color coordinates into a color gamut having a maximum lightness, L*=0. As shown in FIG. 5, the red hue color space 500 includes (1) an "R" axis 521, (2) a "T" axis 522, (3) an L* axis 511, (4) a "C" axis 512, (5) a source color with L* axis color coordinate less than zero 541, (6) source colors with L* axis color coordinate greater than zero 542 and 543, (7) a red color gamut 550, (8) colors gamut-mapped using a spherical coordinate system 561, 562, and 563, (9) colors gamut-mapped using a cylindrical coordinate system 572, and 573, and (10) an origin of the second coordinate system 590.

Using an "RTH" second coordinate system with a first "R" axis, source colors $\{R_1, T_1, h\}$ 541, $\{R_2, T_2, h\}$ 542, and $\{R_3, T_3, h\}$ 543 mapped to $\{R_{M1}, T_1, h\}$ 561, $\{0, T_2, h\}$ 562, $\{0, T_3, h\}$ 563 as described in reference to FIG. 4a. Each light red source color having an L* axis coordinate greater than zero is mapped to color coordinates corresponding to neutral gray.

The source colors $\{R_2, T_2, h\}$ 542, and $\{R_3, T_3, h\}$ 543 may instead be mapped using an "LCH" second coordinate system with a first L* axis. According to this embodiment, the source color $\{R_2, T_2, h\}$ 542, maps to in-gamut red color $\{R_{M2}, T_2, h\}$ 572 as shown. The source color $\{R_3, T_3, h\}$ 543 maps to different in-gamut red color coordinates $\{R_{M3}, T_3, h\}$ 573.

e) A Gamut-mapping Computer System

Figure 6:
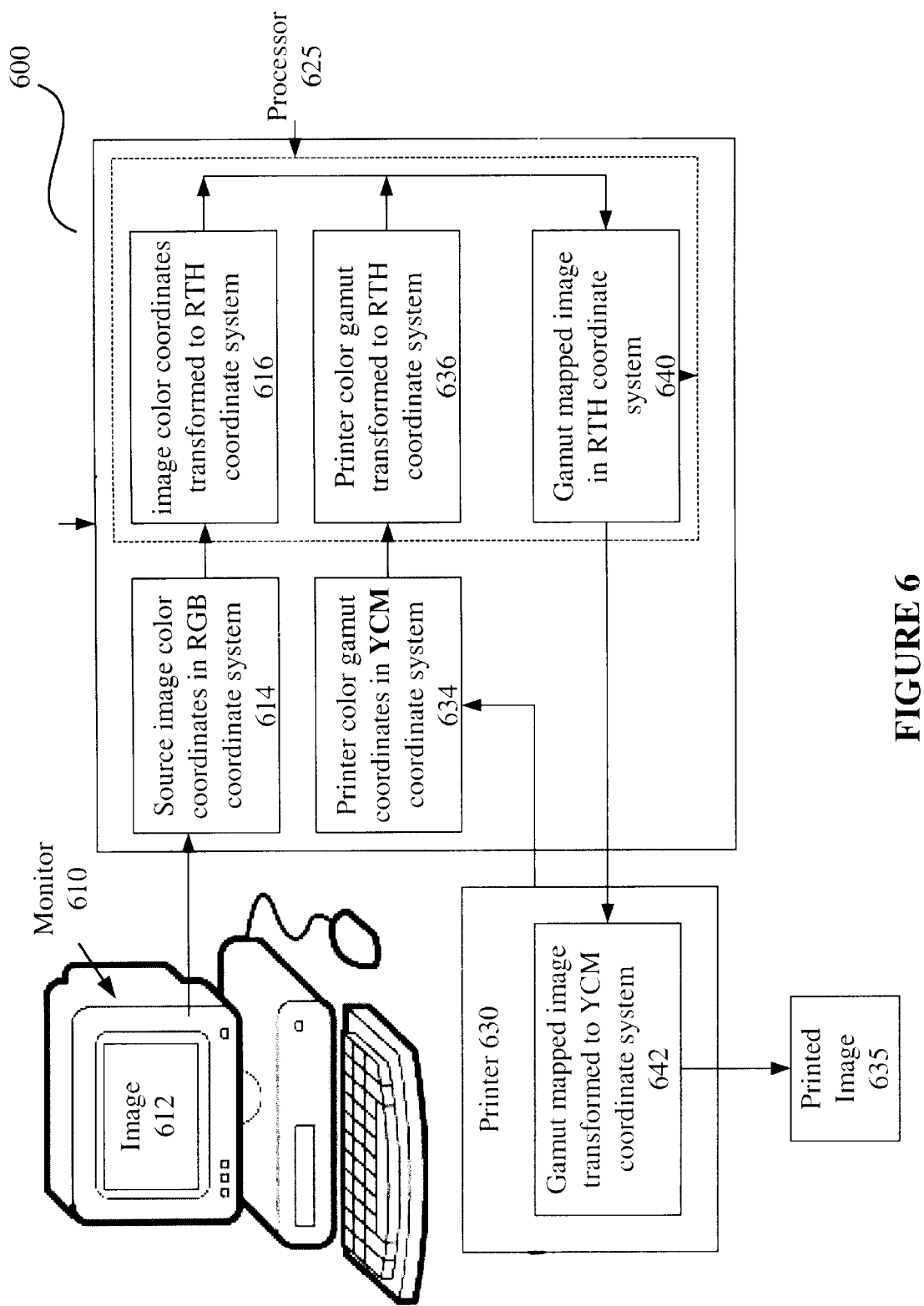
FIG. 6 is a schematic of mapping color coordinates in a computer environment according to at least one embodiment of the invention.

An exemplary embodiment of a computer system is illustrated in FIG. 6. As shown in FIG. 6, the computer system 600 may include a monitor 610, a processor 625, and a printer 630.

Monitor 610 is an imaging device supporting an image 612 defined in a color space coordinate system (e.g., an "RGB" coordinate system). Monitor 610 connects to computer system 600. Computer system 600 may be a mobile computer, desktop computer or any general or special purpose information-processing device. Computer system 600 connects to monitor 610 and printer 625, to interchange and process data. Printer 630 is an imaging device supporting an image 612 defined in a color space coordinate system different than that of monitor 610 (e.g., a "CMY" coordinate system).

According to one embodiment of the invention, "RGB" image 612 is transferred from monitor 610 to computer system 600 and stored as an "RGB" image file including sets of color coordinates 614. The sets of color coordinates of "RGB" image file 614 are transformed to an "RTH" coordinate system, and stored as an "RTH" image file 616. The "CMY" color gamut of printer 630 is transferred from printer 630 to computer system 600 and stored as a "CMY" color gamut file including sets of color coordinates 634. The sets of color coordinates of "CMY" color gamut file 634 are transformed to an "RTH" coordinate system, and stored as an "RTH" color gamut file 636. The color coordinates of "RTH" image file 616 are gamut-mapped into color gamut 636, and stored as gamut-mapped image file 640. The sets of color coordinates of gamut-mapped image file 640 are then transformed to the "CMY" coordinate system, and transferred to printer 630 as gamut-mapped image file 642. Gamut-mapped image file 642 may then be used by printer 630 to form a printed image 635.

The invention in its various embodiments has several features. First, it maps out-of-gamut colors in-gamut without changing the hue of the out-of-gamut color. Second, it changes the gamut-mapping coordinate system so that the "clipping path" can be nearly perpendicular to the local surface of a wide range of device gamuts. Third, the gamut-mapping coordinate system can be modified for each source color, to optimize the clipping path to the local color gamut surface. Fourth, look-up table methods are simplified because the "clipping path" of a source color is determined only by the second and third color coordinates instead of by three color coordinates as are required by standard methods. Finally, by selecting a spherical second coordinate system with an in-gamut origin, all of the source colors map to an in-gamut color by adjusting only the "R" coordinate axis coordinate.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A method of mapping color coordinates defined in a first coordinate system into a first color gamut defined in a second coordinate system, wherein said second coordinate system comprises a spherical coordinate system including an "R" axis having luminosity and chroma parameters, a "T" axis having luminosity and chroma parameters, and an "H" axis having a hue parameter, said method comprising:

a) selecting a first set of color coordinates defined in the first coordinate system;

b) generating a second set of color coordinates defined in the second coordinate system, from the first set of color coordinates; and c) if the second set of color coordinates is outside of the color gamut, reducing an "R" axis color coordinate of said second set of color coordinates so as to generate a first set of gamut-mapped color coordinates inside said color gamut.

2. A method according to claim 1 further comprising:

d) if said second set of color coordinates is in said color gamut, one of not changing said "R" axis color coordinate of said second set of color coordinates and changing said "R" axis color coordinate of said second set of color coordinates so as to form a first set of gamut-mapped color coordinates that remain in said color gamut.

3. A method according to claim 1 further comprising:

e) generating a second set of gamut-mapped color coordinates defined in the first coordinate system, from the first set of gamut-mapped color coordinates.

4. A method according to claim 1 wherein determining whether said second set of color coordinates is outside of said first color gamut comprises:

locating a point on a boundary of said first color gamut having an "H" axis color coordinate and a "T" axis color coordinate equal to an "H" axis color coordinate and a "T" axis color coordinate of said second set of color coordinates;

if an "R" axis color coordinate of said second set of color coordinates is greater than an "R" axis color coordinate of said point on said boundary of said color gamut, determining that said second set of color coordinates is out of said color gamut; and if an "R" axis color coordinate of said second set of color coordinates is not greater than an "R" axis color coordinate of said point on said boundary of said color gamut, determining that said second set of color coordinates is in said color gamut.

5. A method according to claim 1 wherein prior to said generating a second set of color coordinates the method further comprises:

selecting and defining said first color gamut in said first coordinate system.

6. A method according to claim 1 wherein prior to said generating a second set of color coordinates the method further comprises:

selecting a set of color coordinates in first coordinate system, of an origin of said second coordinate system.

7. A method according to claim 6 wherein said origin of said second coordinate system is selected according to at least one of said first set of color coordinates and sets of color coordinates in said first color gamut defined in said first coordinate system.

8. A method according to claim 7 wherein said origin of said second coordinate system is selected according to a look-up table of said first set of color coordinates.

9. A method according to claim 6 further comprising:

repeating said mapping color coordinates for a plurality of sets of color coordinates defined in the first coordinate system.

10. A method according to claim 9 wherein the origin of said second coordinate system selected for mapping said first set of color coordinates defined in the first coordinate system has different color coordinates in said first coordinate system than does an origin of a second coordinate system selected for mapping a third set of color coordinates defined in the first coordinate system.

11. A method according to claim 9 wherein said plurality of sets of color coordinates defined in the first coordinate system comprises a second color gamut and said mapping color coordinates comprises mapping the sets of color coordinates of said second color gamut into said first color gamut.

12. A method according to claim 11 wherein each set of color coordinates contained in a boundary of said second color gamut is mapped to a set of color coordinates contained in a boundary of said first color gamut.

13. A method according to claim 1 wherein said first coordinate system is one of an "RGB" coordinate system, a "CMY" coordinate system, an "CIELAB" coordinate system, another rectangular coordinate system, and an "LCH" cylindrical coordinate system.

14. A method according to claim 1 wherein said generating a second set of color coordinates comprises:

transforming from a rectangular "CIELAB" coordinate system comprising:

an L* axis including a lightness parameter;

an a* axis including a redness and greenness parameter; and a b* axis including a yellowness and blueness parameter; and transforming to a spherical "RTH" coordinate system comprising:

an "R" axis including chroma and luminosity parameters according to the equation $$"R"=((L^*-c_1)^2+(a^*-c_2)^2+(b^*-c_3)^2);$$

where $c_1+c_2+c_3$ are the arctan and in this case 50, 0, 0 an "H" axis including a hue parameter according to the equation $$"H"=\arctan(b^*/a^*);\text{ and}$$

a "T" axis including chroma and luminosity parameters according to the equation $$"T"=\arccos(L^*/"R").$$

15. A method of mapping color coordinates defined in a first coordinate system into a first color gamut defined in a second coordinate system, wherein said second coordinate system includes a first axis including luminosity and chroma parameters, wherein the first axis is independent of a hue axis and is not identical to a chroma axis, a second axis having luminosity and chroma parameters, and a third axis having a hue parameter, said method comprising:

a) selecting a first set of color coordinates defined in the first coordinate system;

b) generating a second set of color coordinates defined in the second coordinate system, from the first set of color coordinates; and c) if the second set of color coordinates is outside of the color gamut, reducing a first axis color coordinate of said second set of color coordinates so as to generate a first set of gamut-mapped color coordinates inside said color gamut.

16. A method according to claim 15 further comprising:

d) if said second set of color coordinates is in said color gamut, one of not changing said first axis color coordinate of said second set of color coordinates and changing said first axis color coordinate of said second set of color coordinates so as to form a first set of gamut-mapped color coordinates that remain in said color gamut.

17. A method according to claim 15 further comprising:

e) generating a second set of gamut-mapped color coordinates defined in the first coordinate system, from the first set of gamut-mapped color coordinates.

18. A method according to claim 15 wherein determining whether said second set of color coordinates is outside of said first color gamut comprises:

locating a point on a boundary of said first color gamut having a second axis color coordinate and a third axis color coordinate equal to a second axis color coordinate and a third axis color coordinate of said second set of color coordinates;

if a first axis color coordinate of said second set of color coordinates is greater than a first axis color coordinate of said point on said boundary of said color gamut, determining that said second set of color coordinates is out of said color gamut; and if a first axis color coordinate of said second set of color coordinates is not greater than a first axis color coordinate of said point on said boundary of said color gamut, determining that said second set of color coordinates is in said color gamut.

19. A method according to claim 15 wherein prior to said generating a second set of color coordinates the method further comprises:
   selecting and defining said first color gamut in said first coordinate system.

20. A method according to claim 15 wherein prior to said generating a second set of color coordinates the method further comprises:
   selecting said second coordinate system; and
   selecting a set of color coordinates in first coordinate system, of an origin of said second coordinate system.

21. A method according to claim 20 wherein at least one of said second coordinate system and said origin of said second coordinate system is selected according to at least one of said first set of color coordinates and sets of color coordinates in said first color gamut defined in said first coordinate system.

22. A method according to claim 21 wherein at least one of said second coordinate system and said origin of said second coordinate system is selected according to a look-up table of said first set of color coordinates.

23. A method according to claim 20 further comprising:
   repeating said mapping color coordinates for a plurality of sets of color coordinates defined in the first coordinate system.

24. A method according to claim 23 wherein the origin of said second coordinate system selected for mapping said first set of color coordinates defined in the first coordinate system has different color coordinates in said first coordinate system than does an origin of a second coordinate system selected for mapping a third set of color coordinates defined in the first coordinate system.

25. A method according to claim 24 wherein said second coordinate system selected for mapping said first set of color coordinates defined in the first coordinate system has different axes than does a second coordinate system selected for mapping a third set of color coordinates defined in the first coordinate system.

26. A method according to claim 25 wherein at least two of an "R" axis, a chroma axis, a lightness axis, and another hue independent axis comprise a first axis of a second coordinate system for at least one of said plurality of sets of color coordinates defined in the first coordinate system.

27. A method according to claim 23 wherein said plurality of sets of color coordinates defined in the first coordinate system comprises a second color gamut and said mapping color coordinates comprises mapping the sets of color coordinates of said second color gamut into said first color gamut.

28. A method according to claim 27 wherein each set of color coordinates contained in a boundary of said second color gamut is mapped to a set of color coordinates contained in a boundary of said first color gamut.

29. A method according to claim 15 wherein said first coordinate system is one of an "RGB" coordinate system, a "CMY" coordinate system, an "CIELAB" coordinate system, another rectangular coordinate system, and an "LCH" cylindrical coordinate system.

30. A method according to claim 15 wherein said generating a second set of color coordinates comprises:
   transforming from a rectangular "CIELAB" coordinate system comprising:
      an L* axis including a luminosity parameter;
      an a* axis including a redness and greenness parameter; and
      a b* axis including a yellowness and blueness parameter; and
   transforming to a spherical "RTH" coordinate system comprising:
      an "R" axis including chroma and luminosity parameters according to the equation $"R"=(L*-c_1)^2+(a*-c_2)^2+(b*-c_3)^2;$ where $c_1+c_2=c_3$ are the arctan and in this case 50, 0, 0
      an "H" axis including a hue parameter according to the equation $"H"=\arctan(b*/a*);$ and a "T" axis including chroma and luminosity parameters according to the equation $"T"=\arccos(L*/"R").$ 31. A computer readable storage medium on which is embedded one or more computer programs, said one or more computer programs implementing a method for mapping color coordinates defined in a first coordinate system into a first color gamut defined in a second coordinate system, wherein said second coordinate system comprises a spherical coordinate system including an "R" axis having luminosity and chroma parameters, a "T" axis having luminosity and chroma parameters, and an "H" axis having a hue parameter, said one or more computer programs comprising a set of instructions for:
   a) selecting a first set of color coordinates defined in the first coordinate system;
   b) generating a second set of color coordinates defined in the second coordinate system, from the first set of color coordinates; and
   c) if the second set of color coordinates is outside of the color gamut, reducing an "R" axis color coordinate of said second set of color coordinates so as to generate a first set of gamut-mapped color coordinates inside said color gamut.

32. The computer readable storage medium according to claim 31, said one or more computer programs further comprising a set of instructions for:
   transforming from a rectangular "CIELAB" coordinate system comprising:
      an L* axis including a lightness parameter;
      an a* axis including a redness and greenness parameter; and
      a b* axis including a yellowness and blueness parameter; and
   transforming to a spherical "RTH" coordinate system comprising:
      an "R" axis including chroma and luminosity parameters according to the equation $"R"=((L*-c_1)^2+(a*-c_2)^2+(b*-c_3)^2);$ where $c_1+c_2+c_3$ are the arctan and in this case 50, 0, 0
      an "H" axis including a hue parameter according to the equation $"H"=\arctan(b*/a*);$ and a "T" axis including chroma and luminosity parameters according to the equation $"T"=\arccos(L*/"R").$

* * * * *